Feb. 3, 1970  A. H. AGETT ET AL  3,493,357
METHOD AND APPARATUS FOR COOLING SHEET GLASS WITH LIQUID
Filed Oct. 4, 1966
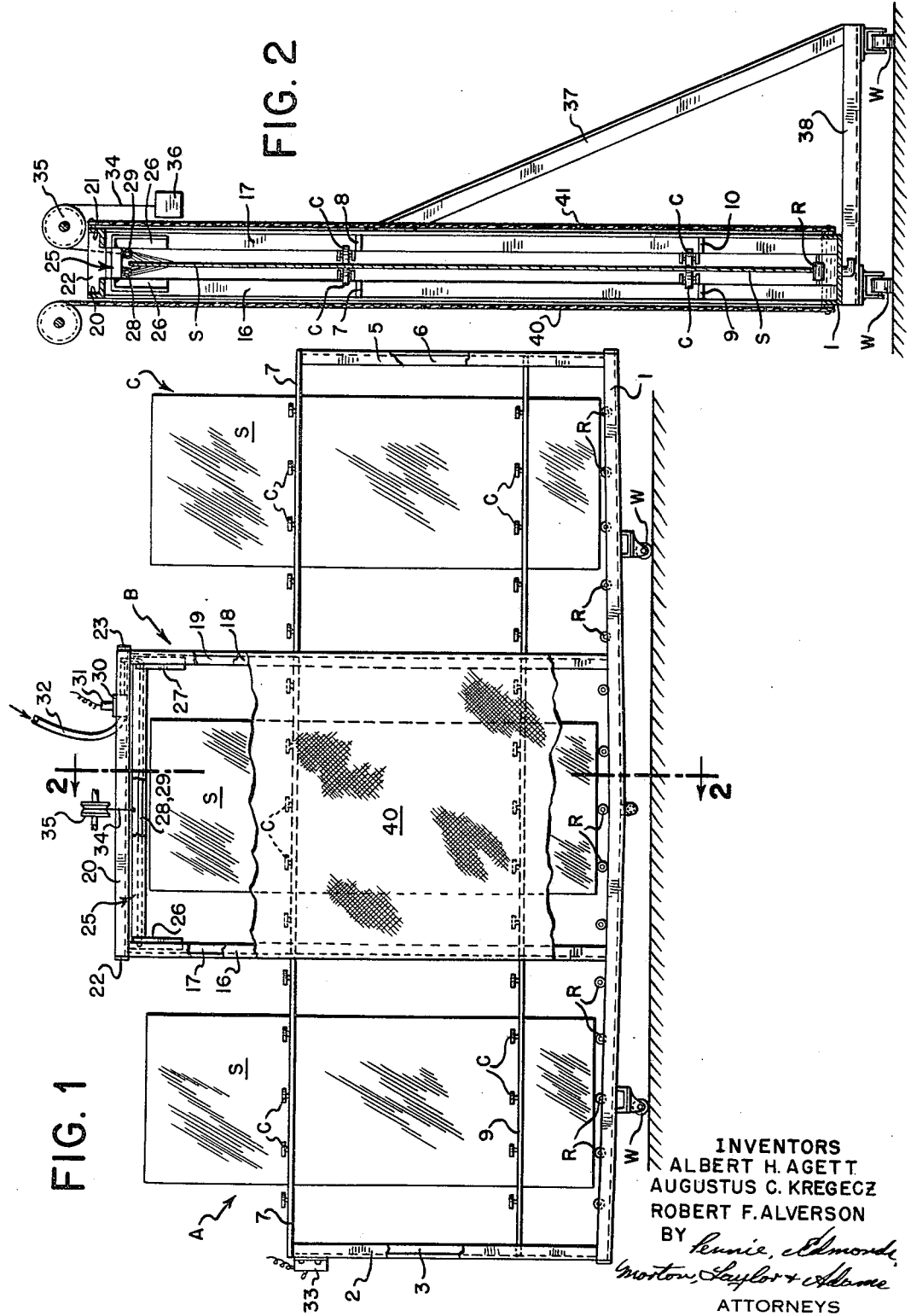
INVENTORS
ALBERT H. AGETT
AUGUSTUS C. KREGECZ
ROBERT F. ALVERSON
BY
Rennie, Edmonds,
Morton, Taylor & Adams
ATTORNEYS 3,493,357
METHOD AND APPARATUS FOR COOLING SHEET GLASS WITH LIQUID Albert H. Agett, Kingsport, Tenn., and Augustus C. Kregecz, Jeannette, and Robert F. Alverson, Pittsburgh, Pa., assignors to American Saint Gobain Corporation, Kingsport, Tenn., a corporation of Delaware
Filed Oct. 4, 1966, Ser. No. 584,181
Int. Cl. C03b 27/00
U.S. Cl. 65—116                    6 Claims

ABSTRACT OF THE DISCLOSURE

Process and apparatus for cooling sheet glass after it emerges from the drawing machine by the uniform application along the top edge of a sheet which is held in substantially vertical position of a film of cooling liquid to each side of the sheet.

---

This invention relates to the cooling of sheet glass and provides an improved process and apparatus for quickly and uniformly cooling the glass with a much reduced amount of thermal breakage. The invention is based on our discovery that a sheet of hot glass, for example at a temperature of about 250° F., can be cooled quickly without breakage by applying a film of cooling liquid along the top edge of the sheet to each side at the same time. This invention includes special apparatus for contacting both sides of the sheet of glass with cooling liquid, preferably water of aqueous solutions.

In the sheet glass manufacturing process the glass emerges from the drawing machine at very high temperature, in the order of 250° F. The capped hot sheet is then placed on bucks or A frames for movement to other areas for processing. When the sheets are placed on a buck in packs, the outer edges of the sheets cool much more rapidly than the center portions of the sheets which sets up a temporary stress in the glass so high that "thermal breakage" results. At the present time the only known practical system to cool sheet glass so that thermal breakage does not occur is by using large volumes of air, and alternate placing of the sheets on two or more bucks or A frames. High volume forced air cooling requires excessive horsepower and is very expensive to install and operate. Alternate placing of sheets on two or more "bucks" does not effectively eliminate the thermal breakage and the "bucks" occupy a large area of operating floor space.

The discovery that a hot sheet of glass can be cooled very rapidly and economically by the uniform application of a cooling liquid was surprising as it has been the prevailing belief that the cooling of a glass sheet in a few seconds as in this invention would usually result in breakage. In accordance with the invention water or other suitable cooling liquid is applied by means of a device extending lengthwise of and adjacent the top edge of a hot sheet of glass which is at approximately 250° F., the liquid flowing onto each side of the glass sheet adjacent the top edge thereof and flowing evenly by gravity downwardly over the entire surfaces of the sheet.

In the accompanying drawings:

FIG. 1 is a side elevation of an aparatus for cooling sheet glass embodying the invention; and FIG. 2 is a sectional view at 2—2 of FIG. 1.

It is well known that sheet glass is drawn in a vertical ribbon and is scored for break-off in a mahine and operation which need not be described. In accordance with the method and apparatus of the invention, after break-off, the hot sheet S is placed in a vertical position in section A of the apparatus illustrated. The apparatus comprises a base 1 mounted on wheels W for movement as required.

The front end angle bars 2 and 3 are attached to the base and spaced apart and the rear angle bars 5 and 6 are also attached to the base and similarly spaced apart. The upper ends are connected longitudinally by rails 7 and 8 and are also connected by intermediate longitudinal rails 9 and 10. The base 1 has a series of rollers R, preferably made of nylon, over which the glass sheets are pushed through the apparatus. The longitudinal rails 7 and 8 and the intermediate rails 9 and 10 are each provided with a series of nylon caster wheels C which support the sheet of glass S in an upright position.

The cooling section B is located between the ends and comprises upright angle bars 16 and 17 and 18 and 19 which are connected at their tops by angle bars 20 and 21 and cross bars 22 and 23. The liquid applicator carriage 25 in section B comprises upright U-shaped guide frames 26 and 27 to which are connected as by welding two spray pipes 28 and 29 which serve to hold the guide frames together. For example, these pipes may be ½ inch copper tubes having $\frac{1}{32}$ inch holes drilled in a straight line ½ inch apart, these small holes flowing a film of cooling liquid gently onto the surface of the glass sheet throughout the length of its top edge and adjacent thereto. The pipes 28 and 29 are connected to the header 30 as by welding and the header is supplied with liquid through an electrically operated valve 31 which is supplied with liquid through hose 32. Valve 31 is electrically connected to the timer and toggle switch 33. Placing the toggle switch in the "on" position energizes valve 31 and starts the timer to 'time out." (The timer can be set from 0 to 60 seconds.) When the timer "times out," valve 31 is de-energized by the timer. The timer will remain in its "timed out" state until the toggle switch is placed in the "off" position. This sort of an arrangement controls the length of time the cooling liquid may flow to the sheet of glass.

The applicator carriage 25 is suspended by a cable 34 which rides on the pulley 35 and is attached to the counterweight 36. The guide frames 26 and 27 slide up and down inside the angle bars 16, 17 and 18, 19. The carriage is adjustable upward and downward so that the liquid sprays can be applied to the top of sheets of variable lengths. The upright angle bars 2, 3, 4, 5, 16, 17, 18 and 19 are spaced apart only sufficient to form the cooling space through which the sheet of glass travels while supported on the rollers R. It is accordingly desirable to provide a brace 37 and base extension 38 to maintain stability. Any suitable side closures can be provided for the cooling section B to confine the water sprays. This may be done advantageously by means of plastic sheet curtains 40 and 41. The water flowing off the bottom edge of the sheet S collects in a pool 39 which is indicated by dotted lines in FIG. 2 in a trough formed by the channel member which forms base 1. An outlet for this water is indicated by the elbow 42 shown in both FIGS. 1 and 2.

With reference to the drawings which illustrate an arrangement of apparatus which is effective for carrying out the invention it will be described in connection with the cooling of sheet glass promptly following scoring and break-off upon emerging from the drawing machine. The sheets of glass at the usual temperature of about 250° F. are slid one at a time into section A between the caster wheels C while resting edgewise on the rollers R.

Each sheet is then pushed manually into cooling section B and as it moves into position it strikes a switch on valve 31 which electrically opens valve 31 to start the sprays of water from pipes 28 and 29 the holes of which direct the water to the top edge of the sheet and the water or other cooling liquid flows downward uniformly over each side effecting rapid and uniform cooling. The timer and toggle switch 33 are electrically connected to the valve 31 and the timer can be set to limit the spraying time from a few seconds to about twenty seconds in order to cool the glass sheet to the temperature desired which is usually about room temperature, 60 to 70° F. The cooled glass sheet is then pushed to the end position, section C, from which it may be removed for further cutting, storage or packaging for shipment.

The following are examples of sheet glass cooling in accordance with the method of the invention.

EXAMPLE 1

20 sheets of mirco glass 38″ x 55″ at an approximate temperature of 200° F. were placed in the apparatus illustrated. The glass was cooled with water at approximately 64° F. in 3 seconds to approximately room temperature. The water was uniformly applied to both sides of the sheet of glass as previously described. No breakage occurred.

EXAMPLE 2

Single strength glass sheets (30″ x 70″) at a temperature of 260° F. were placed in the same apparatus and cooled as described above. The sheets were cooled to room temperature in approximately 6 seconds.

The invention may also be used to cool the sheet of hot glass in the drawing machine without construction a cooler as shown in the drawings. In this case, only the application of the liquid medium as described would have to be arranged and installed in the top portion of the sheet glass drawing machine.

The invention effects the cooling of hot glass sheets to temperatures at which buck breakage due to uneven cooling is eliminated. The sheets are cooled rapidly, economically and in simple apparatus requiring a small space. The apparatus can be integrated into known mechanical handling systems very easily. Although water is the ideal cooling liquid any cooling liquid that is advantageous to the variations that can occur in the sheet glass drawing process and subsequent handling could be utilized. Examples of such liquids include ethylene glycol and water mixtures with ethylene glycol, high boiling and high flash point organic liquids such as phosphate esters, polymeric polyesters and equivalent cooling liquids. A wetting agent may be added to the water to facilitate wetting of the surface and subsequent drying of the sheet.

The cooled sheet may be passed through a driving section in which the liquid is removed as by means of air blowers.

We claim:

1. The method of cooling sheet glass from the temperature prevailing at break-off which comprises uniformly applying throughout the length of the top edge of the sheet while in approximately vertical position a film of cooling liquid on each side of said sheet, and causing the liquid to flow completely over both surfaces simultaneously.

2. The method of cooling sheet glass from the temperature prevailing at break-off which comprises uniformly and gently applying throughout the length of the top edge of the sheet while in approximately vertical position a film of cooling liquid each side of said sheet, and causing the liquid to flow evenly by gravity downwardly over both surfaces simultaneously.

3. Apparatus for cooling sheet glass which comprises means for supporting a sheet of hot glass in vertical edgewise position resting on its bottom edge and including means for mechanically contacting the opposite flat surface of the glass sheet to hold it substantially vertical but leaving such surfaces almost entirely exposed, and means extending adjacent the top edge of each opposite side of the glass sheet and throughout the length of the top edge thereof for gently flowing a band of cooling liquid onto each opposite side of the glass sheet closely adjacent the top edge thereof thereby causing the liquid to flow evenly downwardly by gravity over the entire surface of each side of the sheet, and means below the bottom edge of the glass sheet for collecting the water draining from the sheet.

4. Apparatus for cooling sheet glass as set forth in claim 3 in which the means for flowing the band of cooling liquid onto the glass sheet comprises a small straight metal tube extending along each side of the glass sheet at the top thereof, said tubes having lateral delivery holes of the order of 1/32″ in diameter, said holes being distributed along the lower side of each of said tubes, and means for supplying liquid to said tubes.

5. Apparatus for cooling sheet glass as set forth in claim 3 in which the means for flowing the narrow bands of cooling liquid onto the opposite sides of the glass sheet adjacent its top is shiftable vertically with respect to the means for supporting the sheet at is bottom edge so as to accommodate glass sheets of different heights.

6. Apparatus for cooling sheet glass as set forth in claim 3 wherein the glass sheet is movable into and removable from the apparatus by edgewise horizontal movement, and wherein a timing device is actuated by movement of the glass sheet into the apparatus for starting the aplication of the cooling bands to the glass sheet, said timing device being operable to stop the application of said cooling bands after a predetermined number of seconds.

References Cited

UNITED STATES PATENTS

| | | | |
|---|---|---|---|
| 1,879,698 | 9/1932 | Long | 65—348 X |
| 3,362,806 | 1/1968 | Brewin et al. | 65—119 X |
| 2,146,390 | 2/1939 | White | 65—348 X |
| 2,265,308 | 12/1941 | Perry et al. | 65—348 |

ARTHUR D. KELOGG, Primary Examiner

U.S. Cl. X.R.

65—104, 348